(12) United States Patent
Rotem et al.

(10) Patent No.: US 8,650,424 B2
(45) Date of Patent: Feb. 11, 2014

(54) METHOD AND APPARATUS TO CONTROL POWER CONSUMPTION OF A PLURALITY OF PROCESSOR CORES

(75) Inventors: Efraim Rotem, Haifa (IL); Oren Lamdan, Kiryat Tivon (IL); Alon Naveh, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 12/401,538

(22) Filed: Mar. 10, 2009

(65) Prior Publication Data

US 2009/0172375 A1 Jul. 2, 2009

Related U.S. Application Data

(63) Continuation of application No. 11/026,705, filed on Dec. 30, 2004, now Pat. No. 7,502,948.

(51) Int. Cl.
*G06F 1/00* (2006.01)

(52) U.S. Cl.
USPC ........... 713/323; 713/300; 713/320; 713/322; 713/600

(58) Field of Classification Search
USPC .................. 713/300, 320, 322, 323, 600
See application file for complete search history.

(56) References Cited

U.S. PATENT DOCUMENTS

| | | | |
|---|---|---|---|
| 5,530,932 A | 6/1996 | Carmean et al. | |
| 5,790,817 A | 8/1998 | Asghar et al. | |
| 5,832,284 A | 11/1998 | Michail et al. | |
| 5,862,368 A | 1/1999 | Miller | |
| 6,119,241 A | 9/2000 | Michail et al. | |
| 6,141,762 A | 10/2000 | Nicol et al. | |
| 6,308,279 B1 | 10/2001 | Toll et al. | |
| 6,317,840 B1 | 11/2001 | Dean et al. | |
| 6,631,474 B1 | 10/2003 | Cai et al. | |
| 6,711,447 B1 * | 3/2004 | Saeed | 700/82 |
| 6,766,460 B1 | 7/2004 | Evoy et al. | |
| 6,804,632 B2 | 10/2004 | Orenstien et al. | |
| 6,829,713 B2 | 12/2004 | Cooper et al. | |
| 6,836,849 B2 | 12/2004 | Brock et al. | |
| 6,845,456 B1 | 1/2005 | Menezes et al. | |
| 6,908,227 B2 | 6/2005 | Rusu et al. | |

(Continued)

FOREIGN PATENT DOCUMENTS

| | | |
|---|---|---|
| DE | 20212071 | 11/2002 |
| JP | 09097122 | 4/1997 |
| TW | 445412 | 7/2001 |
| WO | WO-2005/124550 | 12/2005 |

OTHER PUBLICATIONS

"OA Mailed Dec. 15, 2008 for CN 200580044230.7", (Dec. 15, 2008), Whole Document.

(Continued)

*Primary Examiner* — Jaweed A Abbaszadeh
(74) *Attorney, Agent, or Firm* — Matthew C. Fagan

(57) ABSTRACT

For one disclosed embodiment, a plurality of processor cores of a multicore processor may be operated at variable performance levels. One processor core may operate at a performance level different than a performance level at which another processor core may operate. Performance levels of multiple processor cores may be identified. Power consumption of the plurality of processor cores may be controlled based at least in part on the identified performance levels. Other embodiments are also disclosed.

20 Claims, 3 Drawing Sheets

(56) References Cited

U.S. PATENT DOCUMENTS

| | | | |
|---|---|---|---|
| 6,988,211 B2 | 1/2006 | Cline et al. | |
| 6,990,598 B2 | 1/2006 | Sherburne, Jr. | |
| 6,996,728 B2 | 2/2006 | Singh et al. | |
| 7,043,649 B2 | 5/2006 | Terrell, II | |
| 7,080,263 B2 | 7/2006 | Barr et al. | |
| 7,093,147 B2 | 8/2006 | Farkas et al. | |
| 7,103,790 B2 | 9/2006 | Rentschler et al. | |
| 7,134,031 B2 | 11/2006 | Flautner | |
| 7,146,514 B2 | 12/2006 | Kaushik et al. | |
| 7,155,617 B2* | 12/2006 | Gary et al. | 713/300 |
| 7,222,245 B2 | 5/2007 | Singh | |
| 7,249,268 B2 | 7/2007 | Bhandarkar | |
| 7,254,812 B1 | 8/2007 | Menezes | |
| 7,257,679 B2 | 8/2007 | Clark | |
| 7,290,155 B2 | 10/2007 | George et al. | |
| 7,313,706 B2 | 12/2007 | Williams et al. | |
| 7,337,334 B2 | 2/2008 | Kuhlmann et al. | |
| 7,386,737 B2 | 6/2008 | Finkelstein et al. | |
| 7,451,333 B2 | 11/2008 | Naveh et al. | |
| 7,463,993 B2 | 12/2008 | Finkelstein et al. | |
| 7,502,948 B2 | 3/2009 | Rotem et al. | |
| 7,526,661 B2* | 4/2009 | Nakajima et al. | 713/320 |
| 7,636,863 B2* | 12/2009 | Oh | 713/320 |
| 7,788,670 B2* | 8/2010 | Bodas et al. | 718/105 |
| 7,831,842 B2 | 11/2010 | Adachi et al. | |
| 8,037,445 B2 | 10/2011 | Poirier et al. | |
| 8,190,863 B2 | 5/2012 | Fossum et al. | |
| 2002/0007464 A1 | 1/2002 | Fung | |
| 2002/0095610 A1 | 7/2002 | Nunomura | |
| 2002/0147932 A1 | 10/2002 | Brock et al. | |
| 2003/0065960 A1 | 4/2003 | Rusu et al. | |
| 2003/0110012 A1 | 6/2003 | Orenstien et al. | |
| 2003/0115495 A1 | 6/2003 | Rawson, III et al. | |
| 2003/0120961 A1* | 6/2003 | Cooper | 713/320 |
| 2003/0204759 A1 | 10/2003 | Singh | |
| 2004/0117678 A1 | 6/2004 | Soltis et al. | |
| 2004/0163000 A1 | 8/2004 | Kuhlmann et al. | |
| 2004/0215986 A1 | 10/2004 | Shakkarwar | |
| 2005/0034002 A1* | 2/2005 | Flautner | 713/322 |
| 2005/0046400 A1* | 3/2005 | Rotem | 323/234 |
| 2005/0091548 A1 | 4/2005 | George et al. | |
| 2005/0132238 A1 | 6/2005 | Nanja | |
| 2005/0154931 A1 | 7/2005 | Oh | |
| 2005/0262365 A1* | 11/2005 | Lint et al. | 713/300 |
| 2005/0289365 A1* | 12/2005 | Bhandarkar | 713/300 |
| 2006/0026447 A1 | 2/2006 | Naveh et al. | |
| 2006/0047986 A1 | 3/2006 | Kurts et al. | |
| 2006/0047987 A1 | 3/2006 | Prabhakaran et al. | |
| 2006/0053326 A1 | 3/2006 | Naveh et al. | |
| 2006/0069936 A1* | 3/2006 | Lint et al. | 713/320 |
| 2006/0090161 A1* | 4/2006 | Bodas et al. | 718/100 |
| 2006/0123251 A1* | 6/2006 | Nakajima et al. | 713/300 |
| 2006/0123252 A1* | 6/2006 | Vaidya et al. | 713/300 |
| 2006/0123253 A1* | 6/2006 | Morgan et al. | 713/300 |
| 2011/0099397 A1 | 4/2011 | Rotem et al. | |

OTHER PUBLICATIONS

"Enhanced Intel SpeedStep Technology for the Intel Pentium M. Processor", *White Paper*, (Mar. 2004), 12 pages.

Finklestein, Lev, et al., "Adaptive Thermal-Based Frequency Bounds Control", U.S. Appl. No. 11/125,769, filed May 10, 2005.

TW PTO, "Office Action", Taiwan Application No. 94146174, pp. 1-8.

English Translation of DE 202 12 071 U1, 5 pages (Nov. 7, 2002).

Patent Abstracts of Japan, Publication No. JP 09-097122 which was published Apr. 8, 1997, 1 page.

PCT International Search Report and Written Opinion for corresponding International Application No. PCT/US2005/046847, mailed Jun. 29, 2006, 15 pages.

U.S. Patent and Trademark Office, Office Action for U.S. Appl. No. 10/880,955, mailed Nov. 7, 2006, 26 pages.

U.S. Patent and Trademark Office, Office Action for U.S. Appl. No. 10/880,955, mailed Mar 21, 2007, 5 pages.

State Intellectual Property Office, P.R. China, Office Action for corresponding Patent Application No. 200580044230.7, issued Dec. 12, 2008, 7 pages.

English Translation of State Intellectual Property Office, P.R. China, Office Action for corresponding Patent Application No. 200580044230.7, issued Dec. 12, 2008, 12 pages.

German Patent and Trade Mark Office, Official Action for corresponding Patent Application No. 11 2005 003 136.5-53 136.5-53, mailed Feb. 11, 2008, 6 pages.

English Translation of German Patent and Trade Mark Office, Official Action for corresponding Patent Application No. 11 2005 003 136.5-53, mailed Feb. 11, 2008, 4 pages.

Taiwan Intellectual Property Office, Office Action and Search Report for corresponding Patent Application No. 94146174, dated Aug. 20, 2008, 4 pages.

English Translation of Taiwan Intellectual Property Office, Office Action for corresponding Patent Application No. 94146174, dated Aug. 20, 2008, 2 pages.

U.S. Patent and Trademark Office, Office Action for corresponding U.S. Appl. No. 11/026,705, Apr. 12, 2007 mail date, 23 pages.

U.S. Patent and Trademark Office, Office Action for corresponding U.S. Appl. No. 11/026,705, Oct. 9, 2007 mail date, 9 pages.

U.S. Patent and Trademark Office, Office Action for corresponding U.S. Appl. No. 11/026,705, Jun. 23, 2008 mail date, 10 pages.

U.S. Patent and Trademark Office, Office Action for corresponding U.S. Appl. No. 12/980,532, Feb. 23, 2012 notification date, 9 pages.

U.S. Patent and Trademark Office, Office Action for corresponding U.S. Appl. No. 12/980,532, Nov. 14, 2012 notification date, 8 pages.

U.S. Patent and Trademark Office, Office Action for corresponding U.S. Appl. No. 12/980,532, Jun. 19, 2013 notification date, 18 pages.

\* cited by examiner

METHOD AND APPARATUS TO CONTROL POWER CONSUMPTION OF A PLURALITY OF PROCESSOR CORES

This application is a Continuation Application of U.S. application Ser. No. 11/026,705, now U.S. Pat. No. 7,502,948 entitled Operating Point Management In Multi-Core Architecture, filed on Dec. 30, 2004, and priority is claimed thereof.

BACKGROUND

1. Technical Field

One or more embodiments of the present invention generally relate to operating point management. In particular, certain embodiments relate to managing operating points in multi-core processing architectures.

2. Discussion

The popularity of computing systems continues to grow and the demand for more complex processing architectures has experienced historical escalations. For example, multi-core processors are becoming more prevalent in the computing industry and are likely to be used in servers, desktop personal computers (PCs), notebook PCs, personal digital assistants (PDAs), wireless "smart" phones, and so on. As the number of processor cores in a system increases, the potential maximum power also increases. Increased power consumption translates into more heat, which poses a number of difficulties for computer designers and manufacturers. For example, device speed and long term reliability can deteriorate as temperature increases. If temperatures reach critically high levels, the heat can cause malfunction, degradations in lifetime or even permanent damage to parts.

While a number of cooling solutions have been developed, a gap continues to grow between the potential heat and the cooling capabilities of modern computing systems. In an effort to narrow this gap, some approaches to power management in computer processors involve the use of one or more on-die temperature sensors in conjunction with a power reduction mechanism. The power reduction mechanism is typically turned on and off (e.g., "throttled") according to the corresponding temperature sensor's state in order to reduce power consumption. Other approaches involve alternatively switching between low and high frequency/voltage operating points.

While these solutions have been acceptable under certain circumstances, there remains considerable room for improvement. For example, these solutions tend to make the system performance more difficult to determine (i.e., the solutions tend to be "non-deterministic"). In fact, temperature based throttling is often highly dependent upon ambient conditions, which can lower the level of performance predictability. For example, on a warm day, more throttling (and therefore lower performance) is likely to occur than on a cool day for the same usage model. In addition, reducing power by throttling between operating points can add to the inconsistency of the user's experience. These drawbacks may be magnified when the gap between the dissipated power and the external cooling capabilities increases due to the presence of multiple processor cores in the system.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Figure 1:
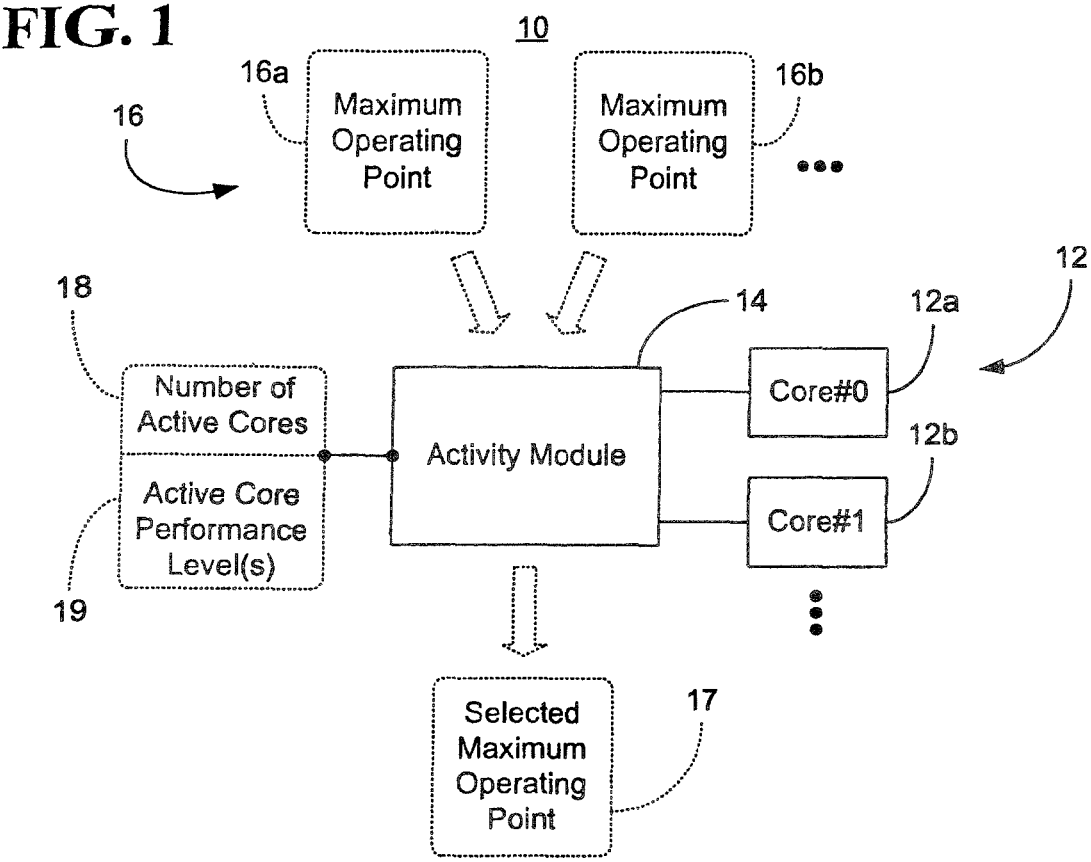
FIG. 1 is a diagram of an example of a processing architecture according to one embodiment of the invention.

FIG. 1 shows a processing architecture 10 having a plurality of processor cores 12 (12a, 12b), an activity module 14 and a plurality of maximum operating points 16 (16a, 16b) from which to select. The processor cores 12 can be similar to a Pentium® 4 processor core available from Intel® Corporation in Santa Clara, Calif., where each core 12 may be fully functional with instruction fetch units, instruction decoders, level one (L1) cache, execution units, and so on (not shown). In addition, the activity module 14 may be implemented in fixed functionality hardware such as complementary metal oxide semiconductor (CMOS) technology, in microcode, in software (e.g., as part of an operating system/OS), or any combination thereof. In the illustrated example, the activity module 14 is implemented in hardware.

In one example, each of the maximum operating points 16 includes a maximum operating frequency and voltage. The maximum operating points 16 can be determined based on knowledge of the cooling solutions available to the system and/or the thermal constraints of the system. For example, it may be determined that in a dual core architecture with only one core active, the system can be properly cooled if the active core is limited to a maximum operating frequency of 2.0 GHz (and/or a core voltage of 1.7 V). It may also be known, however, that if both cores are active, the cores should be limited to a maximum operating frequency of 1.5 GHz (and/or a core voltage of 1.35 V) in order for the cooling solution to be effective. The illustrated activity module 14 determines the number 18 of active cores in the plurality of processor cores 12 and selects a maximum operating point 17 for the active cores based on the number 18 of active cores. The maximum operating points 16 could be stored in a configuration table.

For example, the activity module 14 might make use of a configuration table such as the following Table I, to select a maximum operating point in a dual core architecture.

TABLE I

| # Active | Max Freq. |
|---|---|
| 1 | 2.0 GHz |
| 2 | 1.5 GHz |

Where the first maximum operating point 16a is assigned the value of 2.0 GHz and the second maximum operating point 16b is assigned the value of 1.5 GHz. Thus, if the activity module. 14 determines that the first core 12a is active and the second core 12b is inactive, the number of active cores would be one and the first maximum operating point 16a (i.e., a maximum operating frequency of 2.0 GHz) would be selected for the first core 12a. Similarly, if it is determined that the first core 12a is inactive and the second core 12b is active, the first maximum operating point 16a (i.e., a maximum operating frequency of 2.0 GHz) would be selected for the second core 12b.

If, on the other hand, the activity module 14 determines that both the first core 12a and the second core 12b are active, the number of active cores would be two and the second maximum operating point 16b (i.e., a maximum operating frequency of 1.5 GHz) would be selected for both the first core 12a and the second core 12b. Thus, under the above scenario, the illustrated activity module 14 could determine that both cores 12a, 12b are active and therefore set the second maximum operating point 16b as the selected maximum operating point 17. Specific frequencies are given to facilitate discussion only.

By selecting the maximum operating point 17 based on the number 18 of active cores, the architecture 10 provides a number of advantages over conventional techniques. For example, the gap between the potential maximum power and the available cooling capabilities can be narrowed in a fashion that is not directly dependent upon temperature. Because the dependency on ambient temperature conditions can be minimized, more predictable performance can result. The approaches described herein are more deterministic than conventional approaches. In addition, limiting the operating point based on the number of active cores increases the effectiveness of the available cooling solutions.

The maximum operating point 17 may also be selected based on active core performance levels 19, which can be determined by the activity module 14. In particular, the processor cores 12 may be able to operate at different performance levels based on a variety of factors. For example, one approach may involve switching between low and high frequency/voltage operating points based on core utilization and/or temperature. In any case, it may be determined that an active core is running at a relatively low performance level, which may allow the other core(s) to operate at a higher performance level than would be permitted under a pure active/idle determination.

For example, it may be determined that cores 12a and 12b are active and that the first core 12a is operating at 1.0 GHz. It may also be determined that under such a condition, the second core 12b could operate at a frequency as high as 1.86 GHz without exceeding the cooling capability of the system. Rather than selecting the maximum operating point 17 for both cores to be 1.5 GHz, the activity module 14 could use the active core performance levels 19 to set a first core maximum operating point of 1.0 GHz and a second core maximum operating point of 1.86 GHz. Thus, the selected maximum operating point 17 could have a per-core component.

Figure 2:
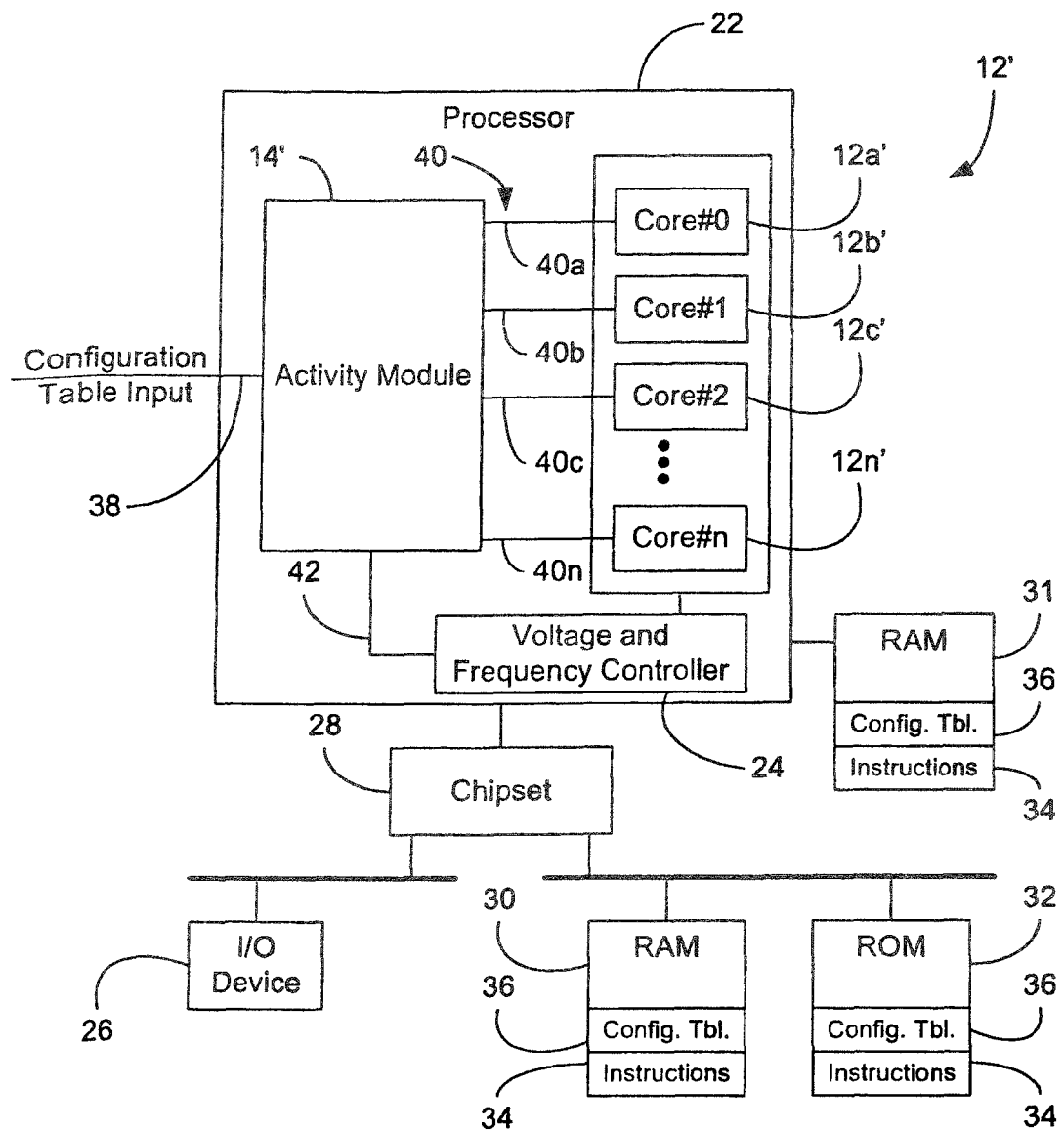
FIG. 2 is a diagram of an example of a system according to one embodiment of the invention.

Turning now to FIG. 2, a system 20 having a multi-core processor 22 is shown, where the system 20 may be part of a server, desktop personal computer (PC), notebook PC, handheld computing device, etc. In the illustrated example, the processor 22 has an activity module 14', a plurality of processor cores 12' (12a'-12n') and a voltage and frequency controller 24.

The illustrated system 20 also includes one or more input/output (I/O) devices 26 and various memory subsystems coupled to the processor 22 either directly or by way of a chipset 28. In the illustrated example, the memory subsystems include a random access memory (RAM) 30 and 31 such as a fast page mode (FPM), error correcting code (ECC), extended data output (EDO) or synchronous dynamic RAM (SDRAM) type of memory, and may also be incorporated in to a single inline memory module (SIMM), dual inline memory module (DIMM), small outline DIMM (SODIMM), and so on. For example, SODIMMs have a reduced packaging height due to a slanted arrangement with respect to the adjacent circuit board. Thus, configuring the RAM 30 as a SODIMM might be particularly useful if the system 20 is part of a notebook PC in which thermal constraints are relatively tight. SODIMMs are described in greater detail in U.S. Pat. No. 5,227,664 to Toshio, et al.

The memory subsystems may also include a read only memory (ROM) 32 such as a compact disk ROM (CD-ROM), magnetic disk, flash memory, etc. The illustrated RAM 30, 31 and ROM 32 include instructions 34 that may be executed by the processor 22 as one or more threads. The ROM 32 may be a basic input/output system (BIOS) flash memory. Each of the RAM 30, 31 and/or ROM 32 are able to store a configuration table 36 that can be used to select maximum operating points. The table 36, which may be calculated "on the fly" by software or pre-stored in memory, can be similar to the Table I discussed above. In this regard, the activity module 14' may include a configuration table input 38 to be used in accessing the configuration table 36.

As already discussed, the activity module 14' is able to determine the number of active cores in the plurality of processor cores 12'. The activity can be determined by monitoring a state signal 40 (40a-40n) of each of the plurality of processor cores 12' and identifying whether each state signal 40 indicates that the corresponding core is active. For example, the activity module 14' could monitor an Advanced Configuration and Power Interface (e.g., ACPI Specification, Rev. 3.0, Sep. 2, 2004; Rev. 2.0c, Aug. 25, 2003; Rev. 2.0, Jul. 27, 2000, etc.) processor power state ("Cx state") signal of each of the plurality of processor cores 12'. ACPI Cx states are relatively unproblematic to monitor and therefore provide a useful solution to determining the number of active cores.

ACPI defines the power state of system processors while in the working state ("G0") as being either active (executing) or sleeping (not executing), where the power states can be applied to each processor core 12'. In particular, processor power states are designated as C0, C1, C2, C3, . . . Cn. The shallowest, C0, power state is an active power state where the CPU executes instructions. The C1 through Cn power states are processor sleeping states where the processor consumes less power and dissipates less heat than leaving the processor in the C0 state. While in a sleeping state, the processor core does not execute any instructions. Each processor sleeping state has a latency associated with entering and exiting the state that corresponds to the state's power savings. In general, the longer the entry/exit latency, the greater the power savings when in the state. To conserve power, an operating system power management (OSPM) module (not shown) places the processor core into one of its supported sleeping states when idle.

The state signals 40 can also include information regarding performance levels. For example, the state signals 40 may indicate the performance level of each active core. Such a signal could be provided by ACPI performance state (Px state) signals. In particular, while in the C0 state, ACPI can allow the performance of the processor core to be altered through a defined "throttling" process and through transitions into multiple performance states (Px states). While a core is in the P0 state, it uses its maximum performance capability and may consume maximum power. While a core is in the P1 state, the performance capability of the core is limited below its maximum and consumes less than maximum power. While a core is in the Pn state, the performance capability of core is at its minimum level and consumes minimal power while remaining in an active state. State n is a maximum number and is processor or device dependent. Processor cores and devices may define support for an arbitrary number of performance states not to exceed 16 according to the ACPI Specification, Rev. 3.0.

Thus, if the illustrated activity module 14' monitors sleep state signals 40, it can identify whether each sleep state signal 40 indicates that the corresponding core is active. The activity module 14' can then search the configuration table 36 for an entry containing the number of active cores. A similar search could be conducted with respect to performance levels. Upon finding the entry, the activity module 14' may retrieve a maximum operating point, via the configuration table input 38, from the entry, where the maximum operating point enables a parameter such as frequency or core voltage to be limited.

For example, the activity module 14' can generate a limit request 42 based on the maximum operating point. As already noted, the limit request 42 may specify a maximum operating frequency and/or maximum core voltage. Thus, as the active cores submit operating point requests to the controller 24, the controller 24 ensures that none of the operating points exceed the maximum operating point specified in the limit request 42. Simply put, the controller 24 can limit the appropriate parameter of the active cores based on the limit request 42.

Although the illustrated system 20 includes a processing architecture that contains a single package/socket, multi-core processor 22, the embodiments of the invention are not so limited. For example, a first subset of the plurality of processor cores 12 could be contained within a first processor package and a second subset of the plurality of processor cores 12 could be contained within a second processor package. Indeed, any processing architecture in which performance predictability and/or power management are issues of concern can benefit from the principles described herein. Notwithstanding, there are a number of aspects of single package/socket, multi-core processors for which the system 20 is well suited.

Figure 3:
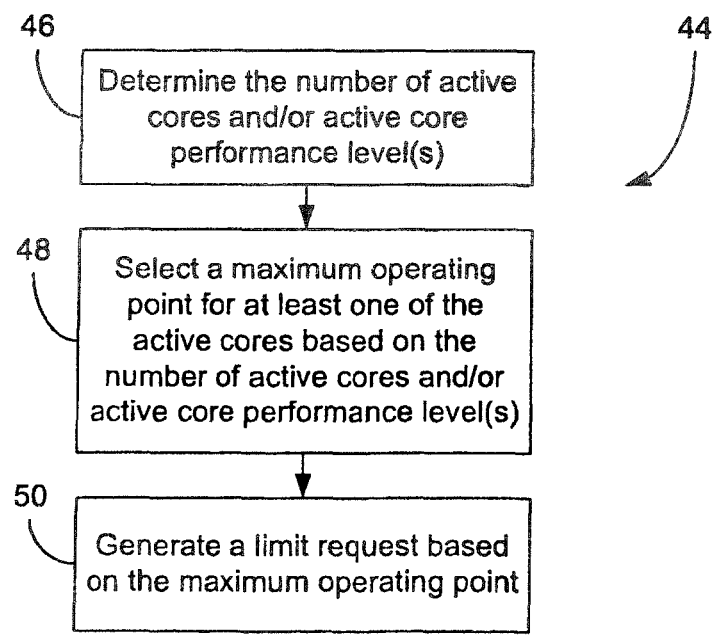
FIG. 3 is a flowchart of an example of a method of managing operating points according to one embodiment of the invention.

Turning now to FIG. 3, a method 44 of managing operating points is shown. The method 44 may be implemented in fixed functionality hardware such as complementary metal oxide semiconductor (CMOS) technology, microcode, software such as part of an operating system (OS), or any combination thereof. Processing block 46 provides for determining the number of active cores in a plurality of processor cores and/or the performance level of each of the active cores. A maximum operating point is selected for the active cores at block 48 based on the number of active cores and/or the active core performance level(s). Block 50 provides for generating a limit request based on the maximum operating point, where an operating parameter of the cores can be limited based on the limit request. The limit request may specify a maximum operating frequency and/or maximum operating voltage.

Figure 4:
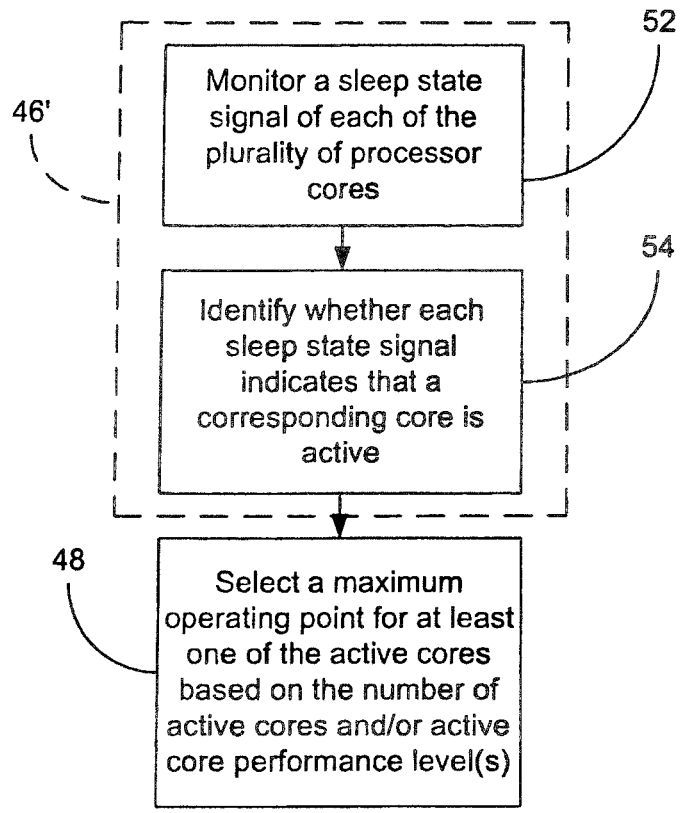
FIG. 4 is a flowchart of an example of a process of determining a number of active cores according to one embodiment of the invention.

FIG. 4 shows one approach to determining the number of active cores in greater detail at block 46'. In particular, the illustrated block 52 provides for monitoring a sleep state signal of each of the plurality of processor cores. As already discussed, the sleep state signals may be ACPI Cx state signals. If the monitoring at block 52 is to include monitoring performance state data, the signals may be ACPI Px state signals. Block 54 provides for identifying whether each sleep state signal indicates that a corresponding core is active.

Figure 5:
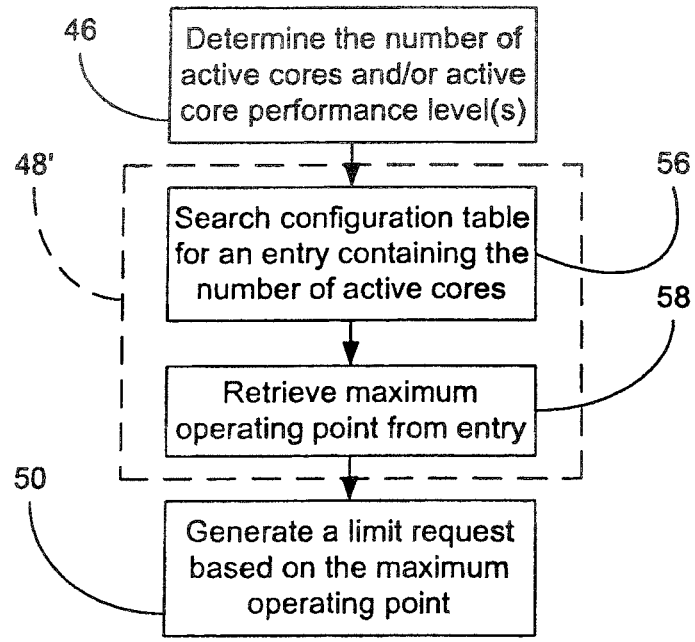
FIG. 5 is a flowchart of an example of a process of selecting a maximum operating point according to one embodiment of the invention.

Turning now to FIG. 5, one approach to selecting a maximum operating point is shown in greater detail at block 48'. In the example shown, the maximum operating point is selected based on the number of active cores. Alternatively, the selection could be based on the performance level of each active core. In particular, the illustrated block 56 provides for searching a configuration table for an entry containing the number of active cores. In one embodiment, the searching is conducted on a BIOS configuration table. The maximum operating point is retrieved from the entry at block 58. Alternatively, the maximum operating points could be calculated. Such an approach may be particularly useful if the selection of maximum operating points is based on active core performance levels. For example, the calculation could involve an averaging (weighted or unweighted) of core operating frequencies. A weighted average may be particularly useful in systems having non-symmetrical cores (i.e., large and small cores in the same system) because the larger cores could be given a greater weight due to their potentially greater contribution to the overall power consumption.

Thus, the embodiments described herein can provide for the constraining of power in multi-core processing architectures while providing predictable performance throughout most of the architecture's power range. By dynamically adjusting the maximum frequency and voltage operating point to the number of active cores in the architecture, these solutions offer a coarse-grained mechanism that can be used as a stand-alone technique or as a complement to traditional temperature-based throttling techniques.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
   a plurality of processor cores of a multicore processor to operate at variable performance levels, wherein one processor core may operate at a performance level different than a performance level at which another processor core may operate; and
   logic to identify performance levels of multiple processor cores and to control power consumption of the plurality of processor cores based at least in part on the identified performance levels,
   wherein the logic is to identify P-states of multiple processor cores to identify performance levels, wherein the P-states are in accordance with an Advanced Configuration and Power Interface (ACPI) specification, and
   wherein the plurality of processor cores are to operate at variable performance levels based at least in part on core utilization.

2. The apparatus of claim 1, the logic to control an operating parameter for one or more processor cores based at least in part on the identified performance levels.

3. The apparatus of claim 1, the logic to control a voltage for one or more processor cores based at least in part on the identified performance levels.

4. The apparatus of claim 1, the logic to identify a maximum voltage for one or more processor cores based at least in part on the identified performance levels.

5. The apparatus of claim 1, the plurality of processor cores to operate at variable frequencies, wherein one processor core may operate at a frequency different than a frequency at which another processor core may operate.

6. The apparatus of claim 1, wherein the plurality of processor cores and the logic are in a single package.

7. A method comprising:
operating a plurality of processor cores of a multicore processor at variable performance levels, wherein one processor core may operate at a performance level different than a performance level at which another processor core may operate;
identifying performance levels of multiple processor cores; and
controlling power consumption of the plurality of processor cores based at least in part on the identified performance levels,
wherein identifying performance levels includes identifying P-states of multiple processor cores, wherein the P-states are in accordance with an Advanced Configuration and Power Interface (ACPI) specification, and
wherein operating a plurality of processor cores includes operating the plurality of processor cores at variable performance levels based at least in part on core utilization.

8. The method of claim 7, wherein controlling power consumption includes controlling an operating parameter for one or more processor cores based at least in part on the identified performance levels.

9. The method of claim 7, wherein controlling power consumption includes controlling a voltage for one or more processor cores based at least in part on the identified performance levels.

10. The method of claim 7, wherein controlling power consumption includes identifying a maximum voltage for one or more processor cores based at least in part on the identified performance levels.

11. The method of claim 7, wherein operating a plurality of processor cores includes operating the plurality of processor cores at variable frequencies, wherein one processor core may operate at a frequency different than a frequency at which another processor core may operate.

12. An apparatus comprising:
a plurality of processor cores of a multicore processor to operate at variable performance levels, wherein one processor core may operate at a performance level different than a performance level at which another processor core may operate; and
logic to identify P-states of multiple processor cores, wherein the P-states are in accordance with an Advanced Configuration and Power Interface (ACPI) specification,
the logic to control an operating parameter for one or more processor cores based at least in part on the identified P-states, and
the plurality of processor cores to operate at variable performance levels based at least in part on core utilization.

13. The apparatus of claim 12, the logic to control a voltage for one or more processor cores based at least in part on the identified P-states.

14. The apparatus of claim 12, the logic to identify a maximum voltage for one or more processor cores based at least in part on the identified P-states.

15. The apparatus of claim 12, the plurality of processor cores to operate at variable frequencies, wherein one processor core may operate at a frequency different than a frequency at which another processor core may operate.

16. The apparatus of claim 12, wherein the plurality of processor cores and the logic are in a single package.

17. A method comprising:
operating a plurality of processor cores of a multicore processor at variable performance levels, wherein one processor core may operate at a performance level different than a performance level at which another processor core may operate;
identifying P-states of multiple processor cores, wherein the P-states are in accordance with an Advanced Configuration and Power Interface (ACPI) specification; and
controlling an operating parameter for one or more processor cores based at least in part on the identified P-states,
wherein operating a plurality of processor cores includes operating the plurality of processor cores at variable performance levels based at least in part on core utilization.

18. The method of claim 17, wherein controlling an operating parameter includes controlling a voltage for one or more processor cores based at least in part on the identified P-states.

19. The method of claim 17, wherein controlling an operating parameter includes identifying a maximum voltage for one or more processor cores based at least in part on the identified P-states.

20. The method of claim 17, wherein operating a plurality of processor cores includes operating the plurality of processor cores at variable frequencies, wherein one processor core may operate at a frequency different than a frequency at which another processor core may operate.

* * * * *